(12) United States Patent
Courtay et al.

(10) Patent No.: US 9,241,263 B2
(45) Date of Patent: Jan. 19, 2016

(54) METHODS AND A DEVICE FOR ASSOCIATING A FIRST DEVICE WITH A SECOND DEVICE

(75) Inventors: Olivier Courtay, Rennes (FR); Christophe Vincent, Chevaigni (FR)

(73) Assignee: THOMSON LICENSING, Boulogne-Billancourt (FR)

( * ) Notice: Subject to any disclaimer, the term of this patent is extended or adjusted under 35 U.S.C. 154(b) by 1281 days.

(21) Appl. No.: 12/312,312

(22) PCT Filed: Oct. 24, 2007

(86) PCT No.: PCT/EP2007/061383
§ 371 (c)(1),
(2), (4) Date: May 5, 2009

(87) PCT Pub. No.: WO2008/055781
PCT Pub. Date: May 15, 2008

(65) Prior Publication Data
US 2010/0058448 A1   Mar. 4, 2010

(30) Foreign Application Priority Data
Nov. 9, 2006   (EP) .................................... 06301136

(51) Int. Cl.
*H04L 29/06*   (2006.01)
*H04W 12/06*   (2009.01)
*H04W 8/00*   (2009.01)

(52) U.S. Cl.
CPC ........... *H04W 12/06* (2013.01); *H04L 63/0869* (2013.01); *H04L 63/0876* (2013.01); *H04W 8/005* (2013.01)

(58) Field of Classification Search
CPC  H04W 12/02; H04L 63/0869; H04L 63/0876
USPC ................................................ 726/2; 713/169
See application file for complete search history.

(56) References Cited

U.S. PATENT DOCUMENTS 5,633,912 A * 5/1997 Tsoi ............................. 455/566
6,046,780 A   4/2000 Tani et al.
(Continued)

FOREIGN PATENT DOCUMENTS

EP   1286502   2/2003
EP   1411674   4/2004
(Continued)

OTHER PUBLICATIONS

C. Gehrmann and C. J. Mitchell, "Manual authentication for wireless devices," pp. 1-9, Jan. 23, 2004.*
(Continued)

*Primary Examiner* — Mohammad L Rahman
(74) *Attorney, Agent, or Firm* — Tutunjian & Bitetto, P.C.

(57) ABSTRACT

Methods for associating a first and a second device. Each device broadcasts an identity, the first device stores new identities and counts them. Upon user instruction and if there just one new identity, the first device sends a request for association to the second device that acknowledges this. The second device then sends, upon user instruction, a confirmation to the first device that verifies that the confirmation was sent by the second device and acknowledges this. The method is particularly suitable for use on devices that are unable to display identities of other devices.

15 Claims, 6 Drawing Sheets

(56) References Cited

U.S. PATENT DOCUMENTS

| | | | |
|---|---|---|---|
| 6,128,307 | A | 10/2000 | Brown |
| 6,292,747 | B1 | 9/2001 | Amro et al. |
| 6,438,109 | B1 | 8/2002 | Karaoguz et al. |
| 6,567,915 | B1 * | 5/2003 | Guthery .................. 713/168 |
| 6,591,103 | B1 | 7/2003 | Dunn et al. |
| 6,728,531 | B1 | 4/2004 | Lee et al. |
| 6,772,335 | B2 | 8/2004 | Curtis et al. |
| 6,879,812 | B2 | 4/2005 | Agrawal et al. |
| 7,302,699 | B2 * | 11/2007 | Nagasaka ..................... 726/3 |
| 7,385,966 | B2 | 6/2008 | Monteiro et al. |
| 7,624,421 | B2 * | 11/2009 | Ozzie et al. ................. 726/1 |
| 7,773,972 | B2 * | 8/2010 | Croome et al. ............. 455/411 |
| 8,132,236 | B2 * | 3/2012 | Hawkins et al. ............ 726/4 |
| 8,429,714 | B2 | 4/2013 | Courtay |
| 2002/0034172 | A1 | 3/2002 | Ho |
| 2003/0120920 | A1 | 6/2003 | Svensson |
| 2003/0154277 | A1 | 8/2003 | Haddad et al. |
| 2003/0220765 | A1 | 11/2003 | Overy |
| 2003/0226017 | A1 | 12/2003 | Palekar et al. |
| 2004/0114036 | A1 | 6/2004 | Karaoguz et al. |
| 2004/0143630 | A1 | 7/2004 | Kaufmann et al. |
| 2005/0090264 | A1 | 4/2005 | Kim |
| 2005/0172145 | A1 | 8/2005 | Kindberg et al. |
| 2005/0222756 | A1 | 10/2005 | Davis et al. |
| 2007/0143823 | A1 * | 6/2007 | Olsen et al. ................. 726/1 |

FOREIGN PATENT DOCUMENTS

| | | |
|---|---|---|
| EP | 1566938 | 8/2005 |
| EP | 1720313 | 11/2006 |
| FR | 2845848 | 4/2004 |
| GB | 0326091 | 3/1930 |
| GB | 2374779 | 10/2002 |
| JP | 2005142841 | 6/2005 |
| JP | 2008541212 | 11/2008 |
| WO | WO0203625 | 1/2002 |
| WO | WO 03001350 A3 * | 3/2003 |
| WO | WO0355217 | 7/2003 |
| WO | WO2004066564 | 8/2004 |
| WO | WO2005057876 | 6/2005 |

OTHER PUBLICATIONS

F. Stajano et al: "The resurrecting duckling: security issues for Ad-Hoc wireless networks" Security Protocols. Int'l Workshop Proceedings, Sep. 15, 1999, pp. 1-11, XP002290299.

Search Report Dated Dec. 21, 2007.

"Public-key cryptography", https://en.wikipedia.org/wiki/Public-key_cryptography, Jul. 23, 2014.

"Man-in-the-middle attack", http://en.wikipedia.org/wiki/Man_in_the_middle_attack, Jul. 23, 2014.

"RSA", http://en.wikipedia.org/wiki/RSA, Jul. 23, 2014.

Prigent, Nicolas et al., "Secure Long Term Communities In Ad Hoc Networks", SASN 2003 Proceedings of the 1st ACM workshop on Security of Ad Hoc and Sensor Networks, Washington, DC, USA, Oct. 27, 2003, pp. 115-124.

"AirStation One-Touch Secure System", www.buffalotech.com, Oct. 1, 2004.

"Phonex Broadband Never Wire 14 User Guide", www.phonex.com, Version 1, May 1, 2002.

"UPnP Forum", www.upnp.org, Jul. 23, 2014.

\* cited by examiner

METHODS AND A DEVICE FOR ASSOCIATING A FIRST DEVICE WITH A SECOND DEVICE

This application claims the benefit, under 35 U.S.C. §365 of International Application PCT/EP2007/061383, filed Oct. 24, 2007, which was published in accordance with PCT Article 21(2) on May 15, 2008 in English and which claims the benefit of European patent application No. 06301136.5, filed on Nov. 9, 2006.

FIELD OF THE INVENTION

The present invention relates generally to secure networks, and in particular to the association of devices in such networks.

BACKGROUND OF THE INVENTION

An important security problem with computer networks is that humans are involved. Administrating such a network requires specific knowledge, which the average user rarely has. For this reason, a user faced with complicated user interfaces often opts for the lowest level of security, sometimes even removing it completely. It can thus clearly be appreciated that there is a need for an easy way to facilitate the task for the user as much as possible, while keeping security at an acceptable level.

European patent application EP 1411674 A1 presents a solution where a central point, at the simple click of a button, restricts the coverage of the radio waves it transmits. Then the user activates a function on a device within the reduced coverage area to insert it into the network of the central point. A disadvantage with this solution is that it is rather vulnerable to various kinds of attacks, such as for example the well-known man-in-the-middle attack.

The present invention attempts to remedy at least some of the security concerns connected with the prior art, while enabling a user to create a secure community of devices that may be equipped with very simple user interfaces.

SUMMARY OF THE INVENTION

In a first aspect, the invention is directed to a method of associating a first device and a second device. The first device receives instructions to broadcast its identity and broadcasts its identity. The second device receives the identity of the first device, receives instructions to broadcast its identity, and broadcasts its identity. The first device receives the identity of the second device, receives instructions to associate with the second device, and counts a number of received new identities. If the number of received new identities equals one, the first device sends a request for association to the second device. The second device receives instructions to associate with the first device, and sends a confirmation of the association with the first device.

In a preferred embodiment, the first device verifies that the confirmation was sent by the second device. It is advantageous that the first device sends an acknowledgement to the second device upon successful verification of the confirmation.

In a further preferred embodiment, the second device sends an acknowledgement to the first device upon reception of the request.

In yet another preferred embodiment, at least the first device lacks the capability to display the identity of the second device.

In yet a further preferred embodiment, the broadcasts with the identity of the devices are identical in format.

In a second aspect, the invention is directed to a method at a first device for associating with a second device. The first device receives instructions to broadcast its identity, broadcasts its identity, receives an identity of at least the second device. The format of the received message carrying the identity of the second device is identical with the format of the message carrying the identity of the first device. The first device then receives instructions to associate with the second device, counts a number of received new identities. If the number of received new identities equals one, the first device sends a request for association to the second device, and receives a confirmation of the association.

In a preferred embodiment, the first device verifies that the confirmation was sent by the second device. It is advantageous that the first device sends an acknowledgement upon successful verification.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

Figure 1:
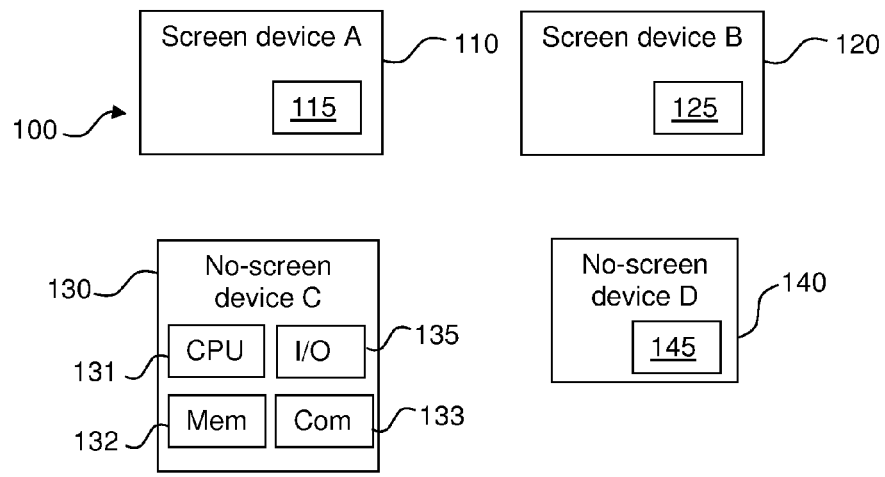
FIG. 1 illustrates an exemplary community in which the invention is used.
Figure 4:
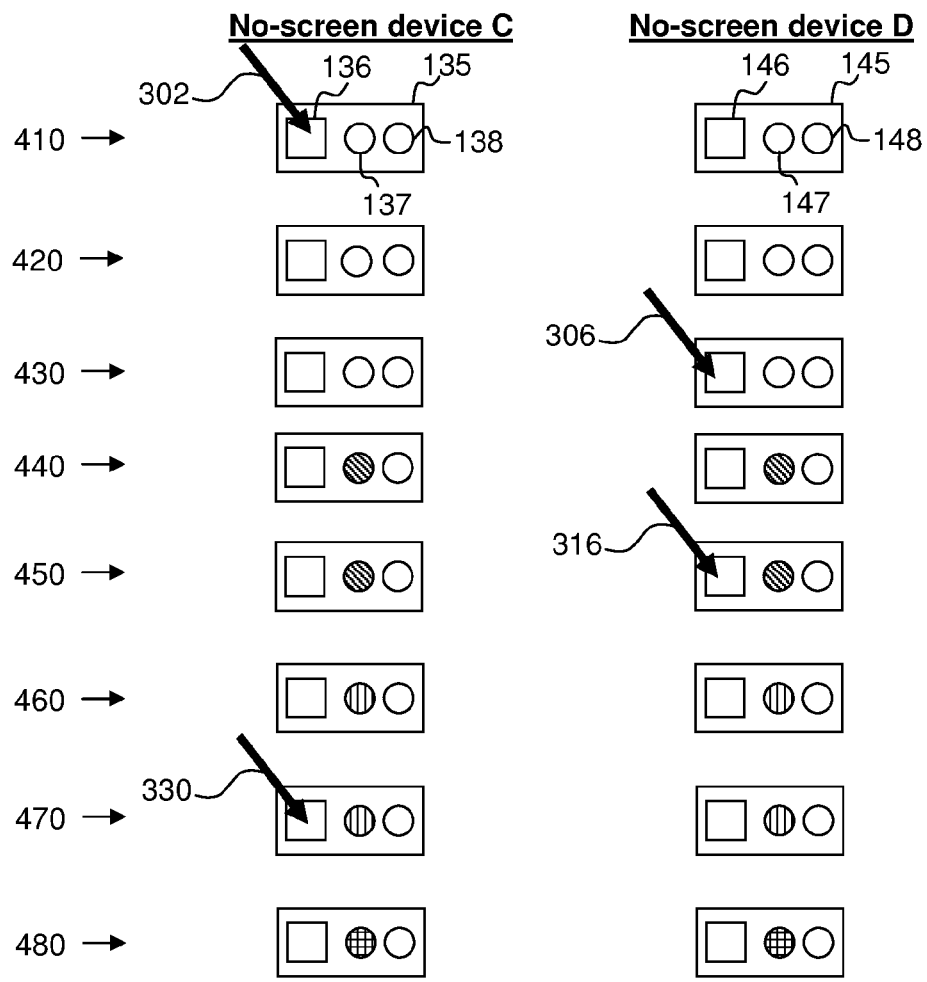
FIG. 4 illustrates exemplary simple user interfaces during execution of the embodiment of the method illustrated in FIG. 3.

FIG. 1 illustrates an exemplary community 100 in which the invention is used. The community 100 comprises two devices—screen device A 110 and screen device B 120—with full user interfaces (115 and 125, respectively) and two devices—no-screen device C 130 and no-screen device D 140—with limited user interfaces (135 and 145, respectively). In the context of the invention, a limited user interface may for example be a device with limited input capabilities such as a single button or voice recognition that is able to discern a few commands, and limited output capabilities such as for example a few LEDs or a screen capable of displaying a few characters, such that for example an identity of another device cannot be displayed to the user. With reference to FIG. 4, the exemplary limited user interface 135, 145 comprises one button 136, 146 for receiving user commands, one green LED 137, 147, and one red LED 138, 148. The full user interfaces on the other hand allow for example a user to enter at least numbers or to select identities from a first list and commands from a second list, and to easily view longer numbers or representative images on the display.

Although illustrated only for No-Screen device C 130 for the sake of clarity, each device comprises a communication unit 133 for interaction with other devices. The communication unit 133 preferably uses radio technology for communication, but other means of communication, such as for example infrared light, may also be used. In addition, each device comprises a memory (illustrated as 132 for No-Screen device C only) and a processor (illustrated as 131 for No-Screen device C 120 only) for calculation, verification, and for controlling the devices.

Figure 2:
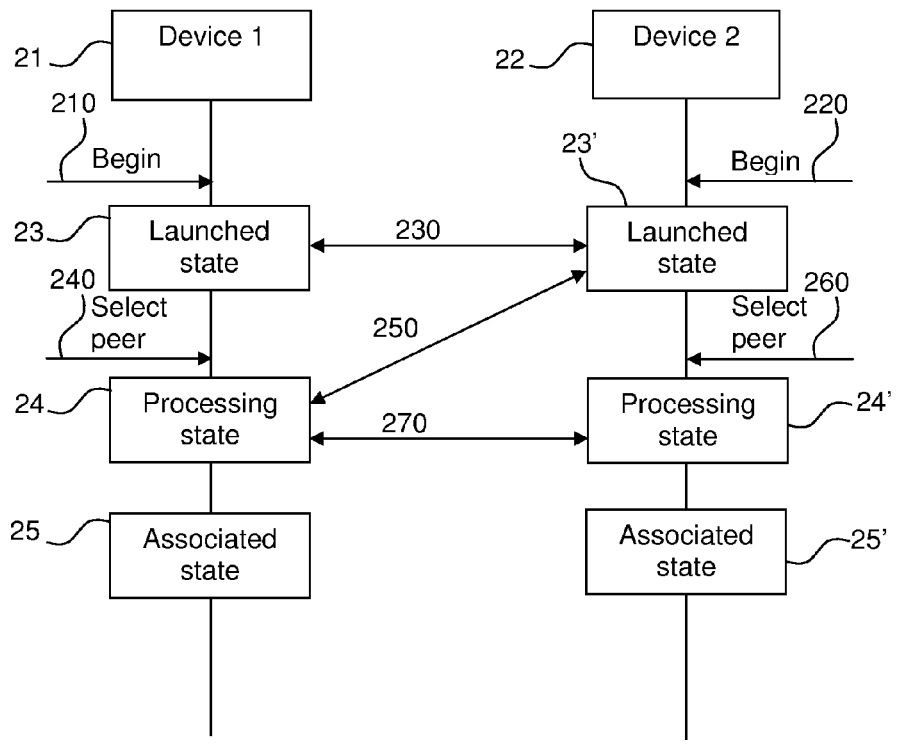
FIG. 2 illustrates a flow chart of the general idea of the invention.

FIG. 2 illustrates a flow chart of the general idea of the invention. The figure shows a first device 21 and a second device 22, which both may be either a screen device (i.e. with full user interface) or a no-screen device (with limited user interface). At first, the user (not shown) activates both devices 21, 22 by instructing them to perform a requisite action, "Begin", 210, 220, which causes the devices 21, 22 to enter a launched state 23, 23', during which information is exchanged 230. The user then selects 240 on the first device 21 the peer to associate with, i.e. the second device 22, which causes the first device 21 to enter a processing state 24 as well as further information exchange 250 between the devices 21, 22. Then, the user selects 260 on the second device 22 the peer to associate with, i.e. the first device 21, which causes the second device 22 to enter a processing state 24' and the devices 21, 22 to exchange more information 270. Once the necessary information has been exchanged, both devices 21, 22 become associated and enter an associated state 25, 25'.

Figure 3:
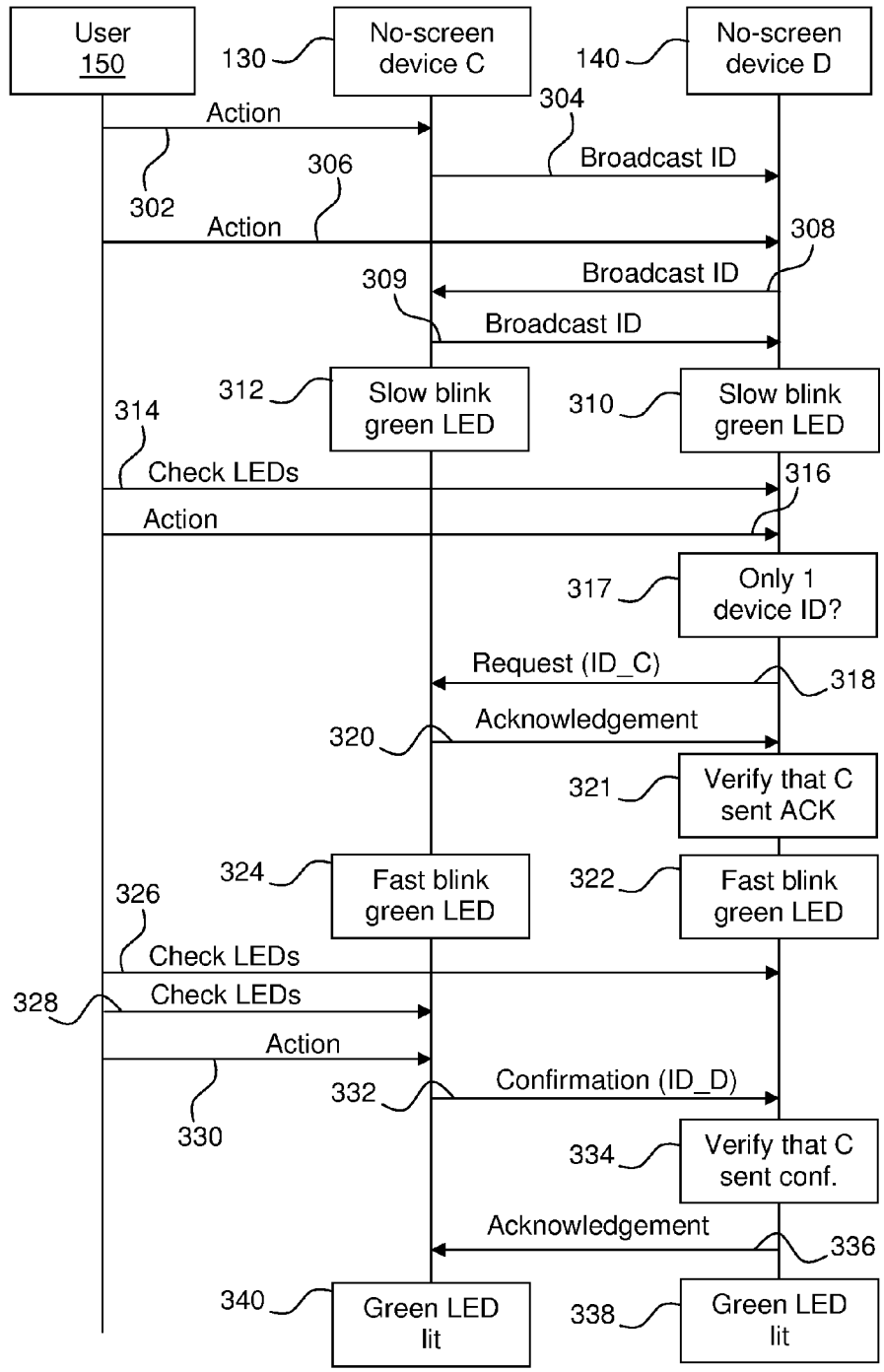
FIG. 3 illustrates a flowchart of an embodiment of the method according to the invention.

FIG. 3 illustrates a flowchart of an embodiment of the method according to the invention, in which a first no-screen device 130 (device C) and a second no-screen device 140 (device D) will become associated. The method begins when the user 150 performs 302 an action on device C 130. The action in question may be any kind of action that instructs the device to e.g. change states, such as a voice command or the pressing of a button.

Device C 130 then enters a Broadcast state and starts to broadcast 304 a provable identity (ID) associated with itself. The broadcast is repeated, preferably with short essentially regular intervals, although only one further broadcast ID message 309 is shown in FIG. 3 for reasons of clarity. The broadcast ID may for example be a public RSA key. While broadcasting its broadcast ID, a device listens for broadcast IDs of other devices. If a received broadcast ID is "new", i.e. the receiving and the transmitting devices are not associated, the receiving device increases a "new device" counter, which keeps track of "new" broadcast IDs.

The user 150 then performs 306 the action on device D 140, which then enters the Broadcast state and starts to broadcast 308 a provable ID. Upon reception of device D's broadcast ID 308, device C 130 increases its "new device" counter to 1 (assuming it was 0 before) and device D 140 acts correspondingly upon reception of device C's broadcast ID 309. Both devices 130,140 then signal that they have encountered a new device, in the present embodiment by blinking slowly a green LED 312 and 314, respectively.

It is advantageous that the user 150 then checks 314 the LED of at least one of the devices to make sure that it is in the Broadcast state. The user then performs 316 the action on one of the devices, in the example device D 140, but it is to be understood that the situation is symmetrical at this point and that the user equally well could have chosen device C 130.

Device D 140 checks 317 that it has received only one "new" broadcast ID, i.e. that its "new device" counter equals 1. If this is not the case, device D 140 signals an error, preferably by lighting a red LED, and interrupts the method. In the example, however, device D 140 has received a single "new" broadcast ID and may therefore continue the method. Device D 140 transmits 318 a request to the device from which it received the broadcast ID, i.e. device C 130, by including C's identity in the request or otherwise addressing the request to device C 130, which responds 320 with an acknowledgement. Device D 140 then verifies 321 that the acknowledgement was sent by device C 130, preferably by cryptographically verifying the public key comprised in the broadcast ID message 304. A preferred way of verification is for device D to include a challenge in the request 318, the challenge being encrypted by device C using its private key and returned to device D in the acknowledgement 320, and then verified by device D by decrypting it with the corresponding public key. After this, both devices 130, 140 indicate this, preferably by a quick blink of the green LEDs 322 and 324, respectively, which preferably is verified 326, 328 by the user 150.

Upon successful verification, the user 150 performs 330 the action on device C 130, which causes device C to send 332 a confirmation to device D 140. Upon reception of the confirmation, device D 140 verifies 334 that the confirmation was sent by device C 130, preferably by cryptographically verifying the public key comprised in the broadcast ID message 304. As described in the previous paragraph, it is preferred to use a challenge to be encrypted with a private key and then decrypted using the corresponding public key in order to prove that the encrypting device indeed possesses the private key. In other words, what device D really verifies is that the confirmation is sent by the selected broadcast identity, which device C possesses. If this is the case, device D 140 responds 336 with an acknowledgement, after which the devices 130, 140 are associated, which is preferably indicated 338, 340 by lit green LEDs and the method ends.

It should be noted that if device C 130 receives a second request before the user 150 performs 330 the action the second time, the device signals an error, preferably by lighting a red LED, and interrupts the method. It should also be noted that each device has a timer that is started at least every time the device waits for a message from the other device and that the device signals an error as above if the timer runs out; this way, it is assured that the devices do not get stuck in the middle of the method.

FIG. 4 illustrates exemplary simple user interfaces during execution of the embodiment of the method illustrated in FIG. 3. FIG. 4 shows the respective user interfaces 135, 145 of no-screen device C 130 and no-screen device D 140. Each user interface 135, 145 comprises a button 136, 146, a green LED 137, 147, and a red LED 138, 148.

In step 410, the user performs 302 the action on device C 130. Step 420 illustrates that the user interfaces 135,145 show nothing at this point. In step 430, the user performs 306 the action on device D 140. Step 440 illustrates that the user interfaces 135, 145 indicate this by a slow blink of the green LED 137, 147 (illustrated by diagonal lines). In step 450, the user performs 316 the action again on device D 140, and step 460 illustrates the change in display: the green LEDs 136,146 blink quickly (illustrated by horizontal lines). Then, in step 470, the user performs 330 the action again on device C 130, and step 480 illustrates the change in display: the green LEDs 136, 146 are lit continuously (illustrated by a grid).

Figure 5:
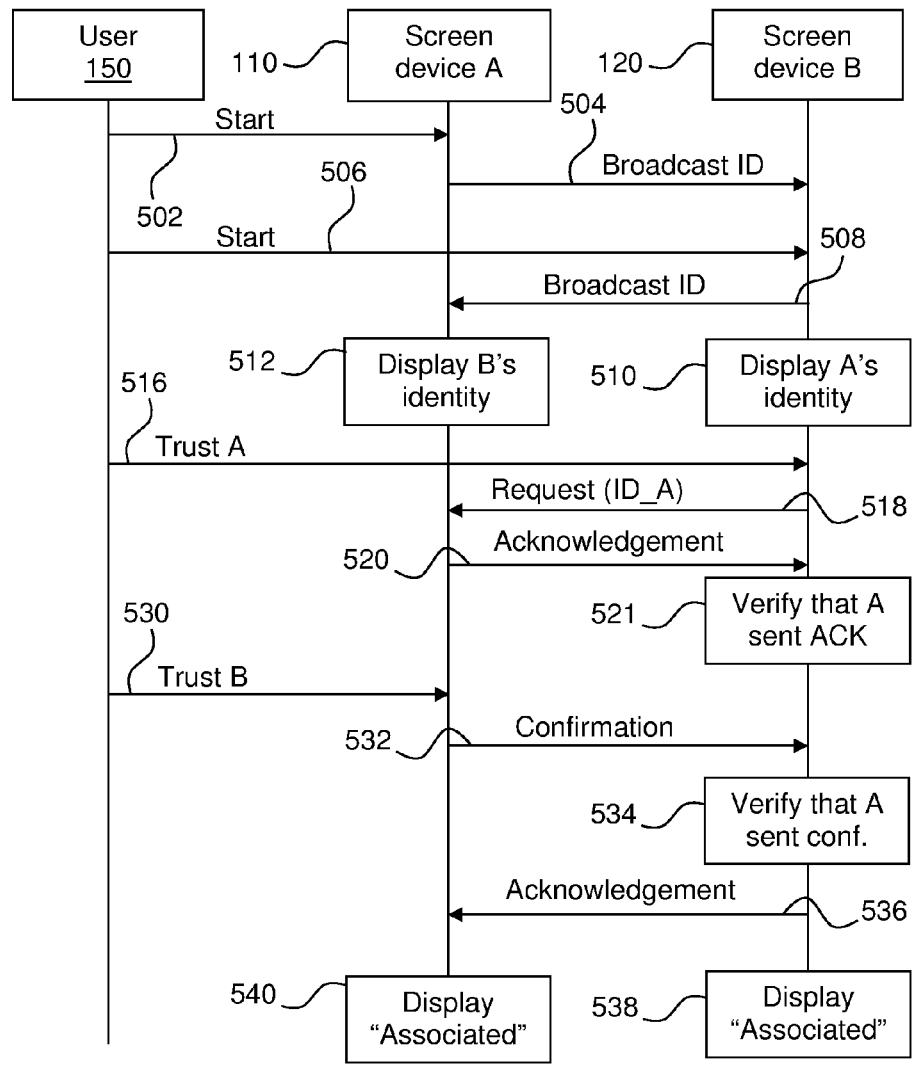
FIG. 5 illustrates a flowchart of a further embodiment of the method according to the invention.

FIG. 5 illustrates a flowchart of an embodiment of the method according to the invention, in which a first screen device 110 (device A) and a second screen device 120 (device B) will become associated. As will be appreciated, there are similarities between the embodiment illustrated in FIG. 5 and the embodiment illustrated in FIG. 3.

The method begins when the user 150 performs 502 an action "Start" on device A 110. The action in question may be any kind of action that instructs the device to e.g. change states, such as the activation of an icon or the pressing of a button in the full user interface.

Device A 110 then enters a Broadcast state and starts to broadcast 504 a provable identity (ID) associated with itself. The broadcast is repeated, preferably with short essentially regular intervals, although only one further broadcast ID message 509 is shown in FIG. 5 for reasons of clarity. The broadcast ID may for example be a public RSA key. While broadcasting its broadcast ID, a device listens for broadcast IDs of other devices.

The user 150 then performs 506 the action on device B 120, which then enters the Broadcast state and starts to broadcast 508 a provable ID. Upon reception of device B's broadcast ID 508, device A 110 displays 512 the ID on the screen; device B analogously displays 510 device A's broadcast ID. It should be noted that instead of displaying just the ID received, each device may display the ID of a number of devices, such as for example the ID of every device present in the network 100.

The user 150 then instructs 516 a device, in the exemplary embodiment device B 120, to trust a chosen ID; in this case device A's ID. Device B 120 transmits 518 a request to the device from which it received the broadcast ID, i.e. device A 110, by including device A's identity in the request or otherwise addressing the request to device A 110, which responds 520 with an acknowledgement. Device B 120 verifies 521 that the acknowledgement was send by device A 110, preferably by cryptographically verifying the public key as described hereinbefore.

The user 150 then performs instructs 530 device A 110 to trust device B 120, which causes device A 110 to send 532 a confirmation to device B 120. Upon reception of the confirmation, device B 120 verifies 534 that the confirmation was sent by device A 110. If this is the case, device B 120 responds 536 with an acknowledgement, after which the devices 110, 120 are associated, which is preferably indicated 538, 540 on the screen and the method ends.

Figure 6:
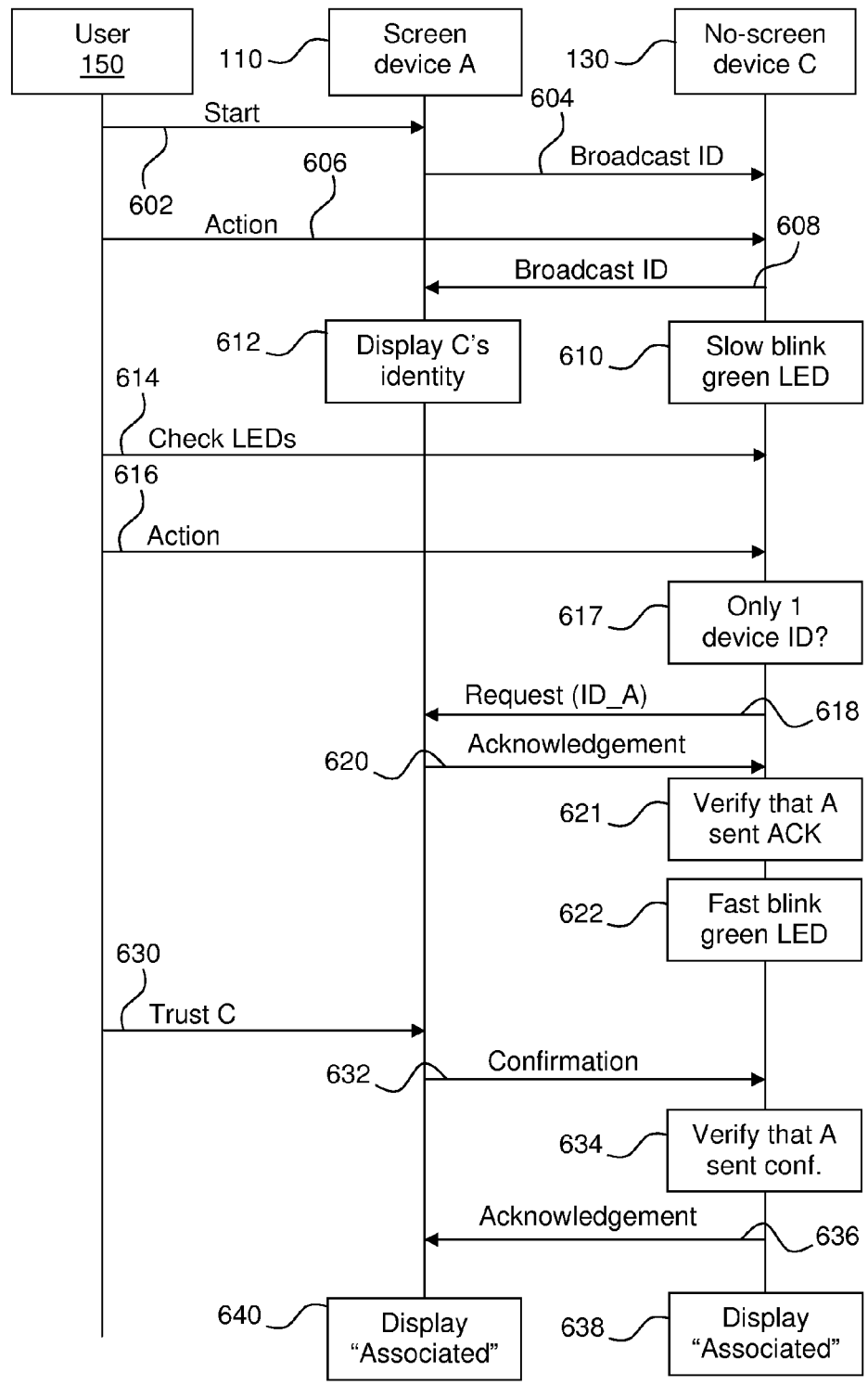
FIG. 6 illustrates a flowchart of yet a further embodiment of the method according to the invention.

FIG. 6 illustrates a flowchart of an embodiment of the method according to the invention, in which a screen device 110 (device A) and a second no-screen device 130 (device C) will become associated. As will become apparent, the embodiment is a mix of the previous embodiments and any details explained in detail in previous Figures may be dealt with quickly in FIG. 6. Indeed, a strength of the method is that it does not matter if a device communicates with a screen device or a no-screen device; the method remains unchanged.

The method begins when the user 150 performs 602 an action "Start" on device A 110, which then starts to broadcast 604, 609 a provable identity (ID) associated with itself. The user 150 then performs 606 the action on device C 130, which then starts to broadcast 608 a provable ID. Both devices 130,140 then signal that they have encountered a new device, device A 110 by displaying 612 device C's broadcast ID on its display and device C 130 by blinking slowly its green LED.

The user 150 then checks 614 the LED of device C 130 to make sure that it broadcasts its ID, and performs 616 the action thereupon. Device C 130 checks 617 that it has received only one "new" broadcast ID. As this is the case in the example, device C 130 transmits 618 a request to the device A 110, which responds 620 with an acknowledgement. Device C 130 verifies 621 that the acknowledgement was sent by device A 110. Device C 130 indicates this by a quick blink of the green LED, which preferably is verified by the user 150.

The user 150 then instructs 630 device A 110 to trust device C 130, which causes device A 110 to send 632 a confirmation to device C 130. Upon reception of the confirmation, device C 130 verifies 634 that the confirmation was sent by device A 110. If this is the case, device C 130 responds 636 with an acknowledgement, after which the devices 110,120 are associated, which is preferably indicated 638, 640 on the screen and the LED, and the method ends.

In order for the devices to enable subsequent secure mutual authentication, the invention proposes the following preferred message scheme:

TABLE 1 message format and content

| | Header | Sender information | Destination information |
|---|---|---|---|
| Broadcast ID | 000 | X | — |
| Request association | 001 | Y | X |
| Acknowledgement | 010 | X | Y |
| Confirmation attempt | 011 | X | — |
| Confirmation | 100 | Y | X |
| Terminate | 101 | X | — |
| Failed | 110 | X or Y | — |

The header distinguishes the type of message. X represents the provable identity of the public key of the sender on 1024 bits and Y represents the provable identity of the public key of the destination on 1024 bits. All messages are signed by an RSA signature and may include sequence numbers to counter replay.

Figure 7:
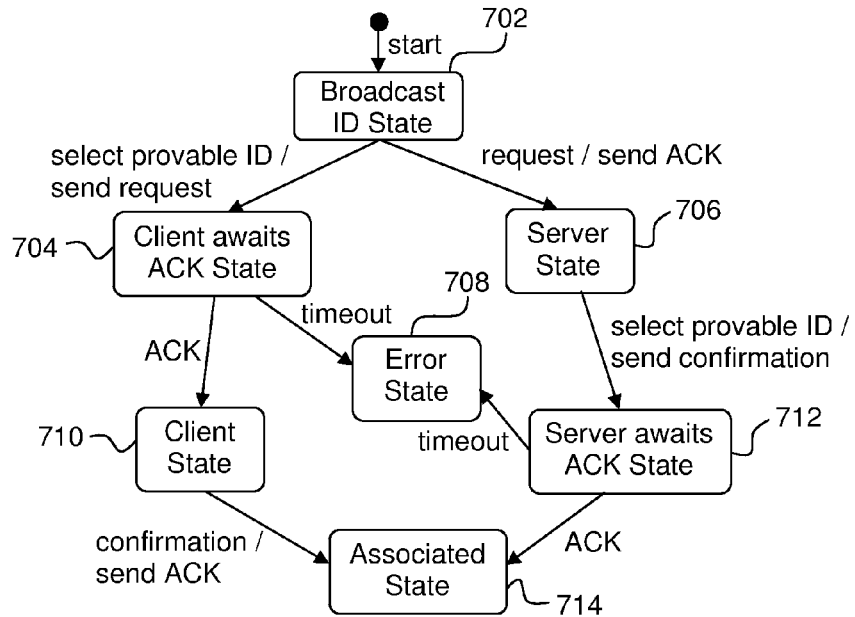
FIG. 7 illustrates a state diagram of a preferred embodiment of a Screen device according to the invention.

FIG. 7 illustrates a state diagram of a preferred embodiment of a Screen device according to the invention. The presence of a slash separates the event that causes a change of state (to the left) from the action performed as a result; e.g. "request/send ACK" means that the state is changed when the device receives a request and that the device then sends an acknowledgement. The absence of a slash means that no action is performed; only the causing event is shown. Furthermore, for illustrational purposes references to FIG. 5 are used in the description whenever this may ease understanding of FIG. 7, but these references are not illustrated.

A device goes to the BroadcastID State 702 whenever the action "start" (502, 506) is performed on it. In this state, the device broadcasts it provable identity.

Upon instructions to trust a further particular device (516), a device sends a request (518) to the further device and changes from the BroadcastID State to the Client awaits ACK State 704. On the other side of the protocol, a device that in the BroadcastID State receives a request (518), sends an acknowledgement (520) and changes to the Server State 706.

If a device in the Client awaits ACK State 704 does not receive an acknowledgement before a timer expires, "timeout", it moves to the Error State 708 and the protocol is interrupted. On the other hand, reception of an acknowledgement (520) causes the device to move to the Client State 710.

From the Server State 706, when a device receives instructions to trust another device (530), the device sends a confirmation (532) and moves to the Server awaits ACK state 712.

In the Client State, upon reception of a confirmation (532), a device sends an acknowledgement (536) and moves to the Associated State 714. This acknowledgement (536) causes a device in the Server awaits ACK State 712 to move to the Associated State 714, after which both devices are in the Associated State. However, a device in the Server awaits ACK State 712 may also move to the Error State 708 if it does not receive an acknowledgement before a timer expires, "timeout".

Figure 8:
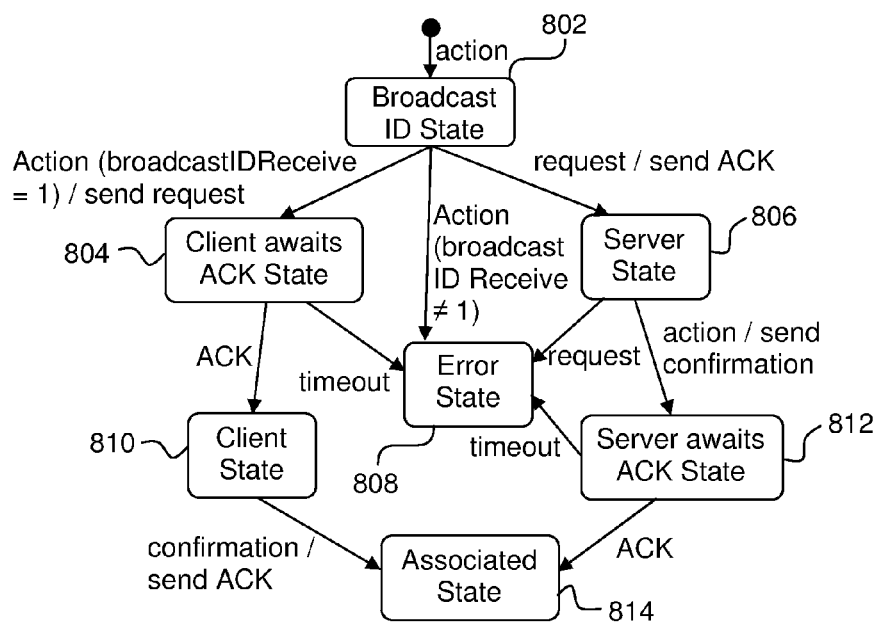
FIG. 8 illustrates a state diagram of a preferred embodiment of a No-Screen device according to the invention.

FIG. 8 illustrates a state diagram of a preferred embodiment of a No-Screen device according to the invention. The presence of a slash separates the event that causes a change of state (to the left) from the action performed as a result; e.g. "request/send ACK" means that the state is changed when the device receives a request and that the device then sends an acknowledgement. The absence of a slash means that no action is performed; only the causing event is shown. Furthermore, for illustrational purposes references to FIG. 3 are used in the description whenever this may ease understanding of FIG. 8, but these references are not illustrated.

A device goes to the BroadcastID State 802 whenever the action (302, 306) is performed on it. In this state, the device broadcasts it provable identity, keeps track of how many broadcast IDs from new devices it has received (BroadcastIDReceive) and slowly blinks its green LED.

Upon instructions to trust a further particular device (316), a device checks how many broadcast IDs from new devices it has received. If this number is not equal to 1—i.e. it has received either no identity whatsoever or more than one identity—the device moves to the Error State 808 and lights its red LED only. On the other hand, if the number, as expected, is equal to 1, the device sends a request (318) to the further device and changes from the BroadcastID State to the Client awaits ACK State 804, in which it continues to slowly blink its green LED. On the other side of the protocol, a device that in the BroadcastID State receives a request (318), sends an acknowledgement (320) and changes to the Server State 806, in which it blinks its green LED quickly.

If a device in the Client awaits ACK State 804 does not receive a valid acknowledgement before a timer expires, "timeout", it moves to the Error State 808. On the other hand, reception of an acknowledgement (320) causes the device to move to the Client State 810, in which it blinks its green LED quickly.

From the Server State 706, if a device receives a further request, it moves to the Error State 808. On the other hand, when the expected "action" is performed on it (330), the device sends a confirmation (332) and moves to the Server awaits ACK state 812, in which it blinks its green LED quickly.

In the Client State, upon reception of a confirmation (332), a device sends an acknowledgement (336) and moves to the Associated State 814 where the green LED is continually lit. This acknowledgement (336) causes a device in the Server awaits ACK State 812 to move to the Associated State 814, after which both devices are in the Associated State. However, a device in the Server awaits ACK State 812 may also move to the Error State 808 if it does not receive an acknowledgement before a timer expires, "timeout".

It will be appreciated that not every possibility has been illustrated in the descriptions of the state diagrams hereinbefore. It is for example possible to add further timeouts, such as from the Client State 710, 810, to further increase the robustness of the protocol. This has not been done for the sake of clarity, but the skilled person will readily realise whenever this is possible.

It can thus be appreciated that the present invention improves upon the prior art by providing a secure way to associate devices using the same protocol regardless of the capabilities of the user interface.

It will be understood that the present invention has been described purely by way of example, and modifications of detail can be made without departing from the scope of the invention.

Each feature disclosed in the description and (where appropriate) the claims and drawings may be provided independently or in any appropriate combination. Features may, where appropriate be implemented in hardware, software, or a combination of the two. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of associating a first device and a second device, comprising:
   receiving by the first device instructions to broadcast its identity;
   broadcasting by the first device its identity;
   receiving by the second device the identity of the first device;
   receiving by the second device instructions to broadcast its identity;
   broadcasting by the second device its identity;
   receiving by the first device the identity of the second device;
   after having received the identity of the second device,
      receiving by a user interface of the first device instructions to associate with the second device; and then
      counting by the first device a number of received new identities;
      if the number of received new identities equals one, sending by the first device a request for association to the second device;
   after having received the request for association;
      receiving by a user interface of the second device instructions to associate with the first device; and
      sending by the second device a confirmation of the association with the first device.

2. The method as claimed in claim 1, further comprising verifying by the first device that the confirmation was sent by the second device.

3. The method as claimed in claim 2, further comprising sending by the first device an acknowledgement to the second device upon successful verification of the confirmation.

4. The method as claimed in claim 1, further comprising sending by the second device an acknowledgement to the first device upon reception of the request.

5. The method as claimed in claim 1, wherein at least the first device lacks the capability to display the identity of the second device.

6. The method as claimed in claim 1, wherein the broadcasts with the identity of the devices are identical in format.

7. A method at a first device for associating with a second device, the method comprising at the first device:
   receiving instructions to broadcast its identity;
   broadcasting its identity;
   receiving an identity of at least the second device, wherein the format of the received message carrying the identity of the second device is identical with the format of the message carrying the identity of the first device;
   after receiving the identity of at least the second device;
      receiving through a user interface instructions to associate with the second device; and then
      counting a number of received new identities;
      if the number of received new identities equals one, sending a request for association to the second device; and
   after sending the request for association, receiving a confirmation of the association.

8. The method as claimed in claim 7, further comprising verifying that the confirmation was sent by the second device.

9. The method as claimed in claim 8, further comprising sending an acknowledgement upon successful verification.

10. A first device configured to associate with a second device, the first device comprising a hardware processor configured to:
- receive instructions to broadcast its identity;
- broadcast its identity;
- receive an identity of at least the second device, wherein the format of the received message carrying the identity of the second device is identical with the format of the message carrying the identity of the first device;
- after receiving the identity of at least the second device;
  - receive through a user interface instructions to associate with the second device; and then
  - count a number of received new identities;
  - if the number of received new identities equals one, sending a request for association to the second device; and
- after sending the request for association, receive a confirmation of the association.

11. The device as claimed in claim 10, wherein the processor is further configured to verify that the confirmation was sent by the second device.

12. The device as claimed in claim 11, wherein the processor is further configured to send an acknowledgement upon successful verification.

13. A first device configured to associate with a second device, the first device comprising:
- means for receiving instructions to broadcast its identity;
- means for broadcasting its identity;
- means for receiving an identity of at least the second device, wherein the format of the received message carrying the identity of the second device is identical with the format of the message carrying the identity of the first device;
- after receiving the identity of at least the second device;
  - means for receiving through a user interface instructions to associate with the second device; and then
  - means for counting a number of received new identities;
  - if the number of received new identities equals one, means for sending a request for association to the second device; and
- after sending the request for association, means for receiving a confirmation of the association.

14. The device as claimed in claim 13, further comprising means for verifying that the confirmation was sent by the second device.

15. The device as claimed in claim 14, further comprising means for sending an acknowledgement upon successful verification.

\* \* \* \* \*